United States Patent Office 2,866,798
Patented Dec. 30, 1958

2,866,798

PROCESS FOR SOLUBILIZATION OF CORTISONE, PREDNISONE, AND THE LOWER ACYL 21-ESTERS THEREOF

Max Jacobson, New York, N. Y.

No Drawing. Application April 13, 1955
Serial No. 501,191

12 Claims. (Cl. 260—397.45)

The present invention relates to a novel process for the solubilization of compounds having adrenal cortex hormones activity such as the steroids having a keto group in the 11-position of the cyclopentanopolyhydrophenanthrene nucleus and to novel complexes thereby obtained. More particularly, it relates to the preparation of novel complexes of the indicated steroids which may be dissolved in water to any dilution for direct injection into the body.

Cortisone acetate has been used widely in the treatment of rheumatoid arthritis and various other conditions. Because of its limited water solubility, however, it has been administered as a solid taken orally or as a suspension which is slow acting because of the time required for liberation into the blood stream. The organic solvents in which it is far more soluble than water could not be employed as injection vehicles because of their incompatibility with the human system.

While processes have been described for the solubilization of cortisone acetate, they have produced solutions containing solubilizing compounds in such high concentration that these latter themselves prevented administration of the solutions by injection. Efforts to reduce the effective concentration of the solubilizing material resulted in the precipitation of the cortisone acetate from solution.

It is therefore an object of the present invention to prepare novel complexes of cortisone acetate which may be dissolved in water to any desired concentration without precipitation and which may be administered intravenously or intramuscularly.

It has now been found that a water-soluble complex of adrenal cortex hormones having an 11-keto group such as cortisone and prednisone, and the 21-esters thereof, may be obtained by dissolving the steroid in a solvent therefor and adding to said solution a minor amount of a strong alkali soluble in said solvent. The volatile solvent is then driven off by heat and the residue, comprising the new complex, may be combined with water to form solutions of any desired dilution. Upon administration the full efficacy of the cortisone acetate is realized.

Since cortisone is commercially available as the 21-acetate and prednisone is available in free form, these are the steroids which are preferred. In place of cortisone acetate, free cortisone or other esters thereof such as the propionate, benzoate, or the like, may be employed. In place of prednisone, 21-esters thereof similar to those of cortisone may be utilized in the solubilization.

Any solvent which is inert with respect to the cortisone acetate may be employed for the initial dissolution although the ease of removal of the solvent will be directly proportional to its solvating effect. Suitable solvents include alcohols such as the lower alkanols, e. g., methyl, ethyl and isopropyl alcohols, and mixtures thereof. These solvents may be mixed with other volatile liquids of different solvating power and thus ethyl alcohol, for example, may be employed in its commercially available form of 95% concentration.

Less volatile solvents such as the glycols, e. g., ethylene glycol, propylene glycol, hexylene glycol, and the like, may be employed, but because of their high boiling points their removal may be attended by decomposition of the cortisone acetate of the complex through prolonged heating at elevated temperatures. Although these slightly volatile solvents may be removed at reduced pressure, this will require special equipment and will require extremely long intervals of time. Accordingly, organic solvents boiling from about 60–80° C. at atmospheric pressure are preferred for the initial dissolution.

Since generally the solvent will be removed prior to injection of the novel complex it is of course desirable that as little solvent be employed as possible to thereby save heat and time. To this end the solvent may be added to the cortisone acetate in a quantity which does not completely dissolve the latter but which forms a partial solution and suspends the remainder. The undissolved residue will be fully dissolved upon the addition of the alkali and the initial heating. Actually if insufficient solvent is employed the effect will be that only the dissolved steroid will be converted to the water-soluble complex. Consequently, the amount of solvent may be varied within wide limits but in the interests of economy and in order to convert as much steroid as possible the solvent should at least be sufficient to form a fine suspension.

It is possible, however, to leave the solubilized steroid without removal of the solvent, since glycols may be injected. The amount of glycol may initially be quite high but upon dilution of the steroid to form a solution suitable for injection the glycol concentration will be reduced to very low levels.

The alkali is employed in at least ten times the molar equivalent of the steroid. To falicitate interaction between the alkali and the steroid, the alkali may conveniently be added as a concentrated solution. The maximum proportion should be 40:1 although the additional alkali will not further aid in the dissolution or solubilization. Consequently, it is generaly sufficient if a ratio of 10:1 to 15:1 is employed. It is preferred that a ratio of about 11:1 is employed since this will satisfy the minimum requirement and will ensure a slight excess to compensate for any possible errors in the weighing of the hormone. In this manner, the weighing of the hormone need not be too exact and the proportioning of the components can thus be accelerated.

The preferred alkali is sodium hydroxide because of its cost and availability in highly purified form. Potassium hydroxide can be employed with equal success as can other alkalies which will dissolve in the solvent for the hormone.

Following the addition of alkali, the solution of steroid in the solvent is heated on a steam bath until removal of the solvent is complete.

The evaporation or distillation of the solvent may be terminated prior to dryness leaving a highly concentrated aqueous or glycol solution or it may be continued until substantially dry. Either the concentrated solution or the dry material may be stored and may subsequently be combined with water in any amount to give a solution of any dilution suitable for injection.

The following non-limitative examples are given by way of illustrating the novel procedures:

*Example I*

(a) 1 gm. of cortisone acetate is placed in a volumetric flask and 50 cc. of 95% ethyl alcohol are added thereto. 5 cc. of aqueous solution containing 200 grams of sodium hydroxide per liter are added to the ethyl alcohol and the mass is heated on a steam bath until dissolution is complete. As a test for completion of the solubilization, distilled water is added to a portion of the test solution. Since no precipitation is caused, dissolution is complete.

The test portion is recombined with the bulk of the solution and heating is continued on the steam bath until the ethyl alcohol has been removed from the solution leaving a highly concentrated aqueous solution of the novel cortisone acetate-alkali metal complex which may be diluted to any strength.

(b) If desired, this concentrated solution may be further heated on the steam bath to remove the major portion of the water. Prior to complete desiccation the active material separates as a dark brown gummy mass. The supernatant alkaline solution is decanted and the active material washed once with distilled water. The product reduces Benedict's solution and may be dissolved in water to any dilution without precipitation.

*Example II*

200 mg. cortisone acetate were suspended in 10 ml. propylene glycol. To this was added 2.2 cc. of a 10% NaOH solution (100 gms. NaOH/liter). The suspension was heated until a clear solution was obtained and dilutability checked by testing a portion of same.

(a) 5 ml of this solution was diluted to 50 ml. with dist. $H_2O$. The resulting solution remained clear and showed no evidence of cortisone acetate having come out of solution.

(b) 5 ml. was evaporated under negative pressure and the dried mass reconstituted with dist. $H_2O$.

*Example III*

50 mg. prednisone was suspended in 5 ml. 95% ET OH. To this was added 0.7 cc. of 10% NaOH. The suspension was heated until a clear solution was obtained and dilutability checked by testing a portion of same. This solution was then evaporated to dryness on boiling $H_2O$ bath and the resulting mass was dissolved in 2 ml. $H_2O$.

The novel complexes may be dissolved in high concentration, viz., 1 gram per 5 cc. of distilled water but such high concentrations are not required generally. Of even greater importance is the fact that the novel complex may be dissolved to form extremely dilute solutions so that no local reactions will be produced at the site of administration. Advantageously stock solutions may be made up and they can be diluted with any amount of water whatsoever to form solutions of any strength.

In place of using the pure hormones for solubilization, it is possible to employ animal organs such as liver, brain, placenta, and the like, which are known sources for such steroids. The desired hormones are solubilized in the same manner as when pure and clinical tests have indicated the activity using either pure hormones or organs as source is substantially the same.

Various changes and modifications may be made without departing from the spirit and scope of the present invention and it is intended that such obvious changes and modifications be embraced by the annexed claims.

Having thus described my invention, what I claim as new and desire to secure by Letters Patent is:

1. The process for the solubilization of an adrenal cortex hormone selected from the group consisting of cortisone, prednisone, and the lower acyl 21-esters thereof, which comprises combining said hormone with from about 10–15 times the molar amount thereof of an alkali metal hydroxide and with a solvent for said hormone and said hydroxide, and heating said combination to moderately elevated temperatures, whereby at least a portion of said hormone is solubilized.

2. The process of claim 1, wherein said solvent comprises a lower alkanol.

3. The process of claim 1, wherein said solvent comprises an alkylene glycol.

4. The process for the solubilization of a steroid selected from the group consisting of cortisone, prednisone, and the lower acyl 21—esters thereof, which comprises combining said steroid with from about 10–15 times the molar amount thereof of an alkali metal hydroxide and with a solvent selected from the group consisting of a lower alkanol and an alkylene glycol, and heating said combination to moderately elevated temperatures, whereby the resulting solution becomes dilutable with water.

5. The process for the solubilization of cortisone acetate which comprises mixing cortisone acetate with from about 10–15 times the molar amount thereof of an alkali metal hydroxide and with a solvent for said cortisone acetate and said hydroxide, and heating said combination to moderately elevated temperatures, whereby the resulting solution becomes dilutable with water.

6. The process of claim 5, wherein said solvent comprises an alkylene glycol.

7. The process for the solubilization of cortisone acetate which comprises mixing cortisone acetate with about 10 to about 15 times the molar amount thereof of an alkali metal hydroxide and with a lower alkanol, and heating said combination at the boiling point thereof until substantially all of said alkanol is driven off.

8. The process of claim 7, wherein said alkali metal hydroxide is sodium hydroxide and said alkanol is ethanol.

9. The process for the solubilization of prednisone which comprises mixing prednisone with from about 10–15 times the molar amount thereof of an alkali metal hydroxide and with a solvent for said prednisone and said hydroxide, and heating said combination to moderately elevated temperatures, whereby the resulting solution becomes dilutable with water.

10. The process of claim 9, wherein said solvent comprises an alkylene glycol.

11. The process for the solubilization of prednisone which comprises mixing prednisone with about 10 to about 15 times the molar amount thereof of an alkali metal hydroxide and with a lower alkanol, and boiling said combination until substantially all of said alkanol is driven off.

12. The process of claim 11, wherein said alkali metal hydroxide is sodium hydroxide and said alkanol is ethanol.

References Cited in the file of this patent

UNITED STATES PATENTS

| | | |
|---|---|---|
| 2,183,589 | Reichstein | Dec. 19, 1939 |
| 2,656,366 | Minlon | Oct. 20, 1953 |
| 2,691,662 | Barsel | Oct. 12, 1954 |